(No Model.)
N. T. CLARK & J. K. HAYNIE.
NUT AND BOLT LOCK.
No. 503,195.    Patented Aug. 15, 1893.
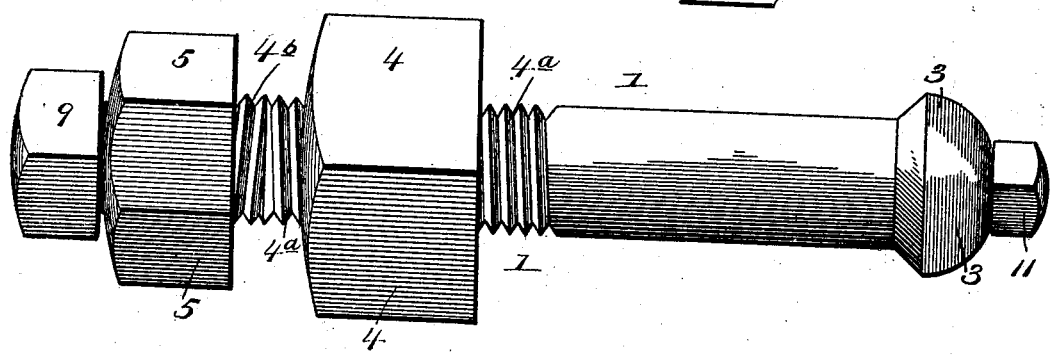
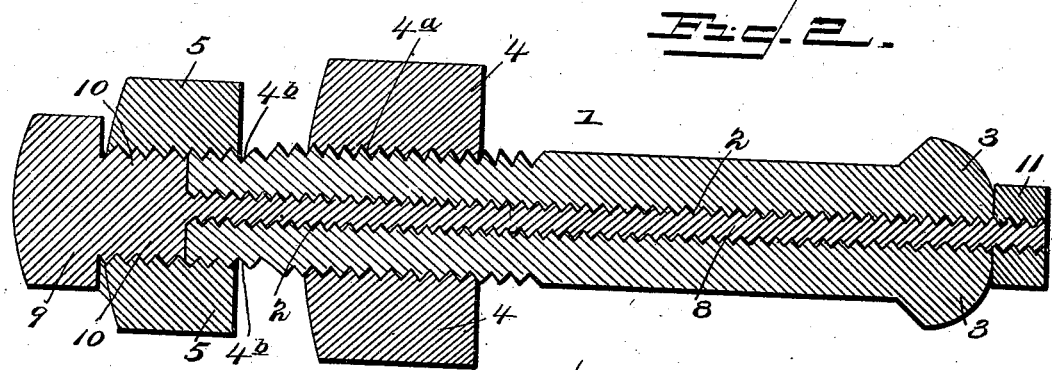
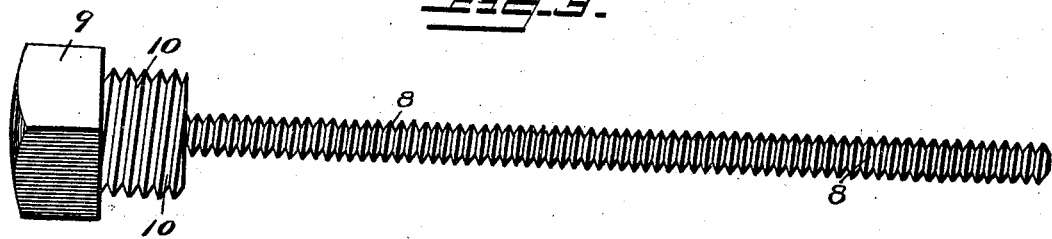
Inventors
Nathaniel T. Clark
Judson K. Haynie
By their Attorneys,
Witnesses

UNITED STATES PATENT OFFICE.

NATHANIEL T. CLARK AND JUDSON K. HAYNIE, OF SHERMAN HEIGHTS, TENNESSEE.

NUT AND BOLT LOCK.

SPECIFICATION forming part of Letters Patent No. 503,195, dated August 15, 1893.

Application filed May 31, 1893. Serial No. 476,135. (No model.)

*To all whom it may concern:*

Be it known that we, NATHANIEL T. CLARK and JUDSON K. HAYNIE, citizens of the United States, residing at Sherman Heights, in the county of Hamilton and State of Tennessee, have invented a new and useful Bolt and Nut Lock, of which the following is a specification.

Our invention relates to improvements in nut-locking devices which are employed in connection with the bolts used in the construction of machines and otherwise, which are subjected to a continual jar due to the operation of the parts, and the object in view is to provide an individual locking device to be used in lieu of the ordinary jam nut, and in which the parts shall be so combined as to prevent accidental loosening even should the members thereof become injured or broken.

The construction, operation, and advantages of our improvement will be fully set forth hereinafter in connection with the drawings, and the novel features thereof will be particularly pointed out in the appended claims.

In the drawings—Figure 1 is a side view of a bolt and nut-locking device embodying our invention. Fig. 2 is a central longitudinal section of the same. Fig. 3 is a detail view of the axial screw.

Similar numerals of reference indicate corresponding parts in all the figures of the drawings.

1 designates the bolt proper which is axially bored as shown at 2, and is provided with the usual head 3, and 4 designates a nut of the ordinary construction which is threaded upon said bolt in the usual manner. The main portion of the exterior thread of the bolt is a right hand thread, as shown at 4$^a$, and the portion 4$^b$ near the extremity of the bolt is a left hand thread, such left hand threaded portion being reduced slightly to enable the nut 4 to be passed thereover without engagement.

5 represents a left threaded jam nut which is engaged with the reduced left threaded portion 4$^b$ of the main bolt.

8 represents an axial screw which is provided with a continous left hand thread to engage the left hand thread in the bore 2 of the bolt; such screw being provided with a head 9 and a shoulder 10 contiguous to said head and having a left hand thread to engage the left hand thread of the jam nut 5, the diameter of such shoulder being the same as the diameter of the reduced portion of the main bolt. Thus the end of the shoulder 10 bears snugly against the extremity of the bolt 1, and any tendency upon the part of the nut 4 to unscrew will be counteracted and prevented by the jam nut which engages the left hand threads. The axial screw 8 is threaded its entire length and projects at its free extremity beyond the head of the bolt 1 where it is engaged by a small retaining nut 11. The object in threading the bore of the bolt 1 and the screw 8 and engaging the same throughout their length is to form, as far as possible, an essentially integral construction when the parts are arranged in their operative positions, as shown in Figs. 1 and 2. This is desirable in order to avoid weakening the section of the bolt 1 and cause the same to have a sectional strength which is equal to that of a solid bolt.

A further advantage in threading the screw 8 throughout its length into the bore of the bolt is that additional security is thus given to the parts and there is virtually no chance for the screw to become detached or rendered inoperative, except by breaking the same at the point of connection of the screw proper to the shoulder 10. Such fracture is rendered improbable by the arrangement of the jam nut 5 which covers and conceals the joint between the shoulder 10 and the extremity of the bolt 1, and hence binds such parts firmly together.

It will be understood from the above description that the parts of our improved bolt and nut-lock are simple in construction and may be readily connected and inexpensively manufactured.

Having described our invention, what we claim is—

1. The combination of a tubular or axially bored bolt, a nut threaded exteriorly upon said bolt, a left hand jam nut engaging a reduced left hand threaded terminal portion of said bolt, an axial screw provided with a left hand thread to engage the correspondingly threaded bore of the bolt and having an enlarged and left hand threaded shoulder to engage within the outer end of the jam nut, and a retaining nut threaded upon the projecting free terminal of the axial screw, substantially as specified.

2. The combination of a tubular or axially bored bolt, which is provided with a continuous interior left hand thread which extends from one end of its bore to the other, a nut threaded exteriorly upon a right hand threaded portion of said bolt, a left threaded jam nut engaging a reduced left threaded terminal portion of the bolt, an axial screw of greater length than the bolt and provided with a continuous left hand thread which is engaged throughout its length with the threaded bore of the bolt, such screw being provided with a left hand threaded shoulder of equal diameter with the reduced left threaded portion of the main bolt and adapted to engage in the outer end of said jam nut, and a retaining nut threaded upon the upper projecting terminal of the axial screw, substantially as specified.

In testimony that we claim the foregoing as our own we have hereto affixed our signatures in the presence of two witnesses.

NATHANIEL T. CLARK.
JUDSON K. HAYNIE.

Witnesses:
W. A. WOOLSON,
JAS. M. STEPHENS.